United States Patent

[11] 3,619,789

[72] Inventors Frank De Jager;
Petrus Josephus Van Gerwen, both of Emmasingel, Eindhoven, Netherlands
[21] Appl. No. 787,744
[22] Filed Dec. 30, 1968
[45] Patented Nov. 9, 1971
[73] Assignee U.S. Philips Corporation
New York, N.Y.
[32] Priority Jan. 3, 1968
[33] Netherlands
[31] 6800093

[54] RECEIVER WITH PRE AND PAST DETECTION PHASE EQUALIZATION
7 Claims, 8 Drawing Figs.

[52] U.S. Cl. .......... 325/480, 179/15 BC, 125/322, 125/324, 125/444, 125/472, 125/476, 328/166, 329/124, 333/18, 333/28
[51] Int. Cl. .......... H04b 1/10
[50] Field of Search .......... 325/49, 59, 60, 322, 324, 444, 480, 42, 323, 347, 369, 371, 377, 381, 387, 475, 476; 179/434–437, 150 R; 178/69.5 DC; 328/162, 163, 164, 166, 167; 329/124, 125, 154, 163; 333/18, 28

[56] References Cited

UNITED STATES PATENTS

| | | | |
|---|---|---|---|
| 2,044,745 | 6/1936 | Hansell | 325/437 |
| 3,324,251 | 6/1967 | Sichak et al. | 333/18 |
| 3,378,770 | 4/1968 | Daguet | 325/60 |
| 3,378,771 | 4/1968 | Gerwen et al. | 325/42 |

*Primary Examiner*—Robert L. Griffin
*Assistant Examiner*—Albert J. Mayer
*Attorney*—Frank R. Trifari

ABSTRACT: A receiver for use with orthogonal modulation signals transmitted along a transmission link having a particular phase shift characteristic features predetection and postdetection phase equalizers. The predetection equalizer produces with the link phase characteristic a symmetrical about the carrier frequency phase characteristic. The postdetection equalizer produces with both the transmission link and predetection equalizer a linear phase characteristic.

INVENTORS
FRANK DE JAGER
PETRUS J. VAN GERWEN
BY

AGENT

INVENTORS
FRANK DE JAGER
PETRUS J. VAN GERWEN
BY
AGENT

RECEIVER WITH PRE AND PAST DETECTION PHASE EQUALIZATION

The invention relates to a receiver for the reception of carrier-modulated information signals, particularly in the form of pulse signals located in a prescribed transmission band in which at least the phase of the carrier characterizes the information signals to be transmitted, the receiver including a plurality of parallel channels each incorporating a demodulator device, a local carrier which has a mutually different phase shift for the various demodulator devices being applied to each demodulator device, while a delay time equalization network preceding the demodulator devices of the receiver is incorporated particularly for the reception of pulse signals transmitted by means of orthogonal modulation, multiphase modulation and the like.

In such receivers special attention must be paid to the delay time equalization since the sensitivity to interference and the pulse recognition are detrimentally affected due to the delay time distortions caused by the nonflat delay time versus frequency characteristic in the transmission band. Particularly if the delay time versus frequency characteristic is not accurately known, the adjustment of the delay time equalization network becomes critical and inconvenient, it being difficult to adjust an optimum delay time equalization.

An object of the invention is to provide a different conception of a receiver of the type mentioned in the preamble in which an optimum delay time equalization is adjusted in a very simple and convenient manner without the delay time versus frequency characteristic being known.

The receiver according to the invention is characterized in that the receiver includes in addition to the delay time equalization networks preceding the demodulator devices, a delay time equalization network following each demodulator device, the delay time versus frequency characteristic being adjusted to a variation which is symmetrical relative to the carrier frequency by means of the delay time equalization networks preceding the demodulator devices, while the delay time versus frequency characteristic is adjusted to a substantially constant value by means of the delay time equalization networks following the demodulator devices.

Figure 1:
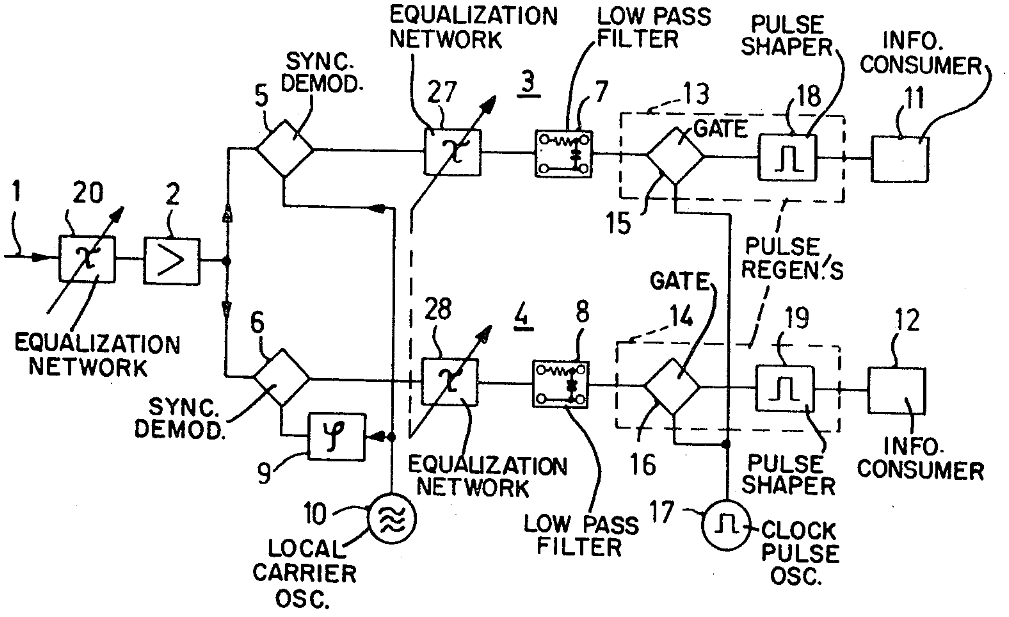
Figure 2A:
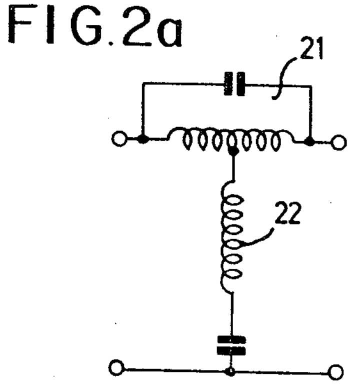
Figure 2B:
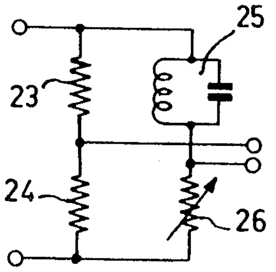

In order that the invention may be readily carried into effect, it will now be described in detail by way of example, with reference to the accompanying diagrammatic drawings, in which:

FIG. 1 shows a receiver according to the invention;

FIGS. 2*a* and 2*b* show a few detailed circuits of a delay time equalization network, while FIGS. 3*a*–3*e* show a few delay time versus frequency characteristic and vector diagrams to explain the receiver of FIG. 1.

FIG. 1 shows a receiver according to the invention which is suitable for the reception of synchronous pulse signals transmitted by means of orthogonal modulation, that is to say, for the reception of two series of synchronous pulse signals modulated on two carriers of the same frequency, which are mutually shifted 90° in phase. The carrier frequency is, for example 1.9 kc./s. and the clock frequency of the two series of synchronous pulse signals is, for example, 2 kc./s.

In the receiver shown the pulse signals received through transmission path 1 and located in the transmission band of 0.7–3.1 kc./s. are applied, after amplification in an input amplifier 2, to two parallel channels 3, 4 including synchronous demodulators 5, 6 respectively in the form of ring modulators and subsequent lowpass filters 7, 8 having a limit frequency of, for example, 1.2 kc./s. The two synchronous demodulators 5, 6 are fed directly and through a 90° network 9, respectively by a common local carrier oscillator 10, the demodulated pulse signals derived from the output circuits of the synchronous demodulators 5, 6 being applied through the lowpass filters 7, 8 to pulse regenerators 13, 14 for further handling in consumer devices 11, 12. By consumer devices is meant any device that utilizes information, such as a computer, a digital to analogue converter, an amplifier, another transmission link, etc.

In this embodiment the pulse regenerators 13, 14 have normally blocked gating devices 15, 16 respectively which are connected to a common clock pulse oscillator 17 and are followed by pulse shapers 18, 19, for example, in the form of monostable pulse generators, Whenever a demodulated pulse and a clock pulse simultaneously occur at the gating devices 15, 16 these devices supply an output pulse which causes an excitation of the pulse shapers 18, 19, so that pulses regenerated by the pulse shapers 18, 19 in accordance with shape and instant of occurrence are applied to the consumer devices 11, 12.

Both the local carrier oscillator 10 and the local clock pulse oscillator 17 are accurately synchronized on the carrier frequency and the clock pulse frequency at the transmitter end, which can be brought about by cotransmitted pilot signals or in other known manner, for example, by the transmission of synchronization signals through separate transmission paths. This synchronization is not important for proper understanding of the present invention and will therefore not be dealt with further.

To prevent in the receiver described so far an unfavorable influence on the sensitivity to interference and on the pulse recognition caused by delay time differences the demodulator devices 5, 6 are preceded by a delay time equalization network 20 which is composed of a number of sections being operative in different portions of the transmission band, which dividing networks are partly designed as fixed networks and for the remaining part as adjustable networks, for example, the delay time equalization network 20 shown for the delay time equalization of the transmission band of 0.7–3.1 kc./s. is composed of 3 fixed and 4 adjustable networks.

For the sake of clarity FIG. 2 shows in a detailed diagram a fixed and an adjustable dividing network of the delay time equalization network 20. As is illustrated in FIG. 2*a* the fixed dividing networks consist of T-filters, the longitudinal branch of which is formed by a parallel circuit 21 and the parallel branch of which is formed by a series circuit 22, while the adjustable dividing networks shown in FIG. 2*b* consist of two parallel arranged branches, the first branch of which is formed by the series arrangement of two resistors 23, 24 and the second branch of which is formed by the series arrangement of a parallel circuit 25 and a resistor 26, the output terminals of the network being connected respectively to the junction of the two resistors 23, 24 in the first branch and the junction of the resistor 26 and the parallel circuit 25 in the second branch. The delay time in the relevant dividing band can be adjusted to a desired value by adjusting the resistor 26 in series with the parallel circuit 25.

Figure 3A:
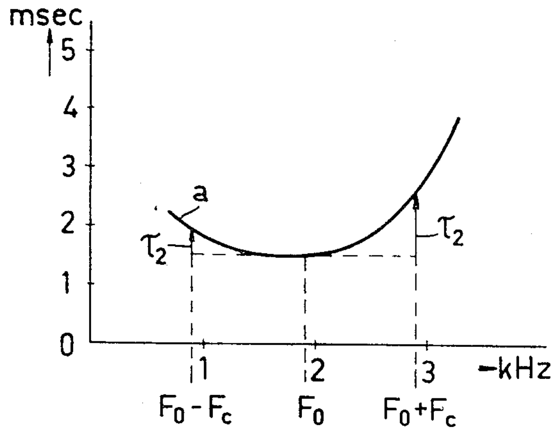

To explain the delay time equalization network 20 shown, the delay time characteristic for the transmission band in the transmission system is shown by the curve *a* in FIG. 3*a*, $F_o$ representing the carrier frequency. Dependent on the frequency the different components of the pulse spectrum experience different delay times during their transmission through the transmission system which gives rise to serious delay time distortions as will now be explained with reference to the vector diagram of FIG. 3*b*.

Figure 3B:
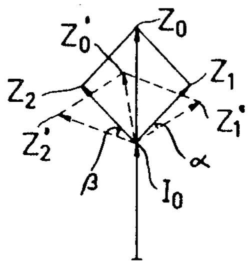

To this end the carrier vector is indicated by $I_o$ in FIG. 3*b* and the sidebands are indicated by the solid-line vectors $Z_1$ and $Z_2$, which sidebands occur at the transmitter end upon modulation of the carrier $F_o$ by a frequency component of a frequency $F_c$ of the pulse spectrum, while the sum vector of the sideband vectors $Z_1$ and $Z_2$ is indicated by $Z_o$ and characterizes the instantaneous modulation of the carrier vector $I_o$. Viewed in the delay time characteristic of FIG. 3*a* the two sidebands are located at the same frequency distance $F_c$ from the carrier frequency $F_o$ and thus show frequencies of $F_o$—$F_c$ and $F_o$—$F_c$ at *b* in FIG. 3*c*.

In the vector diagram of FIG. 3*b* the broken line vectors $Z_1^1$ and $Z_2^1$ and the vector $Z_o^1$ show the sideband vectors and the sum vector after transmission through the transmission system, which sideband vectors $Z_1^1$, $Z_2^1$ have obtained phase shifts $\alpha$ and $\beta$ relative to the carrier vector $I_o$ which are given by the differences in delay time $\tau_1$ and $\tau_2$ of the sidebands of frequencies $F_o-F_c$ and $F_o+F_c$ relative to the carrier frequency $F_o$. Addition of all components of the pulse spectra in the two channels provides the form of the received pulse signals which are distorted to a great extent under influence of the delay time characteristic shown in FIG. 3*a*, so that if the sensitivity to interference deteriorates the pulse recognition is also considerably reduced.

To obtain an optimum delay time equalization the delay time differences of all components in the transmission band relative to the carrier frequency $F_o$ must be produced by adjusting the delay time equalization network 20 or, in other words, the delay times of all components in the transmission band must be adjusted to a constant value which involves an extremely time consuming and critical adjustment as a result of the complexity of the distortions.

To adjust with simplicity of equipment an optimum delay time equalization in a simple and convenient manner the present invention provides a different conception of the delay time equalization consisting in that delay time equalization networks 27, 28 following the demodulator devices 5, 6 are included in the receiver in addition to the delay time equalization network 20 preceding the demodulator devices 5, 6, the delay time versus frequency characteristic being adjusted to a variation which is symmetrical relative to the carrier frequency with the aid of the delay time equalization network 20 preceding the demodulator devices 5, 6 while the delay time versus frequency characteristic is adjusted to a substantially constant value with the aid of the delay time equalization networks 27, 28 following the demodulator devices 5, 6.

Unlike the known device the delay time equalization in the device according to the invention is distributed over the networks 20 and 27, 28 respectively preceding and following the demodulator devices 5, 6 so that the adjustment to optimum delay time equalization is simplified to a considerable extent as will now further be explained.

Figure 3C:
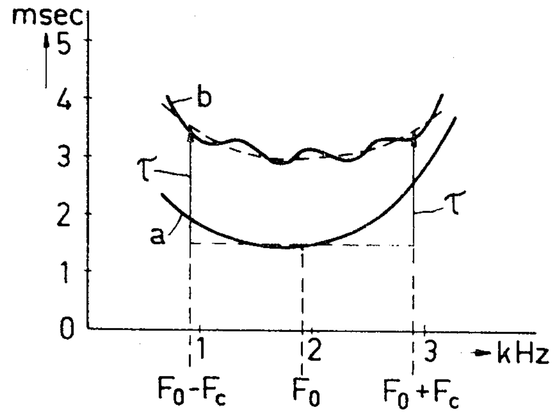
Figure 3D:
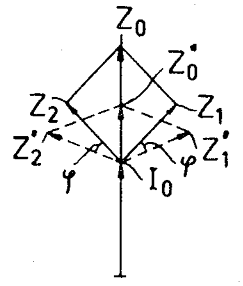

To this end, the delay time characteristic of the transmission band in the transmission system is again shown by curve *a* in FIG. 3*c*, and the vector diagram composed of the carrier vector $I_o$ of frequency $F_o$ and the sideband vectors $Z_1$, $Z_2$ of frequencies $F_o-F_c$ and $F_o+F_C$, respectively, are shown in FIG. 3*d*, in which the influence on the vector diagram will be examined when adjusting the delay time equalization network 20 preceding the demodulator devices 5, 6.

If the delay time equalization network 20 preceding the demodulator devices 5, 6 is adjusted in such manner that the delay time characteristic of the transmission system and the delay time equalization network 20 together show a variation which is symmetrical relative to the carrier frequency $F_o$, for example, in the form of curve *b*, the two sidebands of frequencies $F_o-F_c$ and $F_o+F_c$ respectively, will show mutually identical phase shifts $\Phi$ relative to the carrier after passing through the delay time equalization network 20 as is shown by the broken line vectors $Z_1^1$, $Z_2^1$, since the two sidebands have obtained mutually identical delay time differences $\tau$ relative to the carrier due to this adjustment of the delay time characteristic. Combination of these two vectors $Z_1^1$, $Z_2^1$ provides the sum vectors $Z_o^1$ which as regards direction accurately coincides with the direction of the carrier vector $I_o$ and then has no components in a direction perpendicular to the direction of the carrier vector $I_o$ which means that the crosstalk between the two receiving channels is wholly obviated due to this adjustment of the delay time equalization network 20.

On the one hand the requirement of freedom from crosstalk between the two receiving channels 3, 4 is a very strict criterion of adjustment if, for example, a series of pulses is transmitted exclusively through one of the transmitting channels it is found that a considerable contribution of this pulse series in the other receiving channel occurs, already at a slight asymmetry in the delay time characteristic. On the other hand the adjustment itself is also simplified to a considerable extent since in fact it is no longer necessary to adjust to a constant delay time through the overall transmission band, but that it is now already sufficient to ensure that the delay time characteristic has a variation which is symmetrical relative to the carrier as is shown by the curve *b*. Particularly to this end, half the number of adjustable dividing networks may suffice, for example, 2 adjustable dividing networks which are only operative above the carrier frequency $F_o$ or 2 adjustable dividing networks which are only operative below the carrier frequency $F_o$.

Thus a simple and very convenient adjustment of the delay time equalization network 20 in the device according to the invention is obtained, while also the construction of the delay time equalization network 20 as compared with the known device is simplified to a considerable extent. For a full delay time equalization, the delay time equalization networks 27, 28 following the demodulator devices 5, 6 should, however, still be used in the device according to the invention but these delay time equalization networks 27, 28 are also very simple as regards construction and adjustment.

Figure 3E:
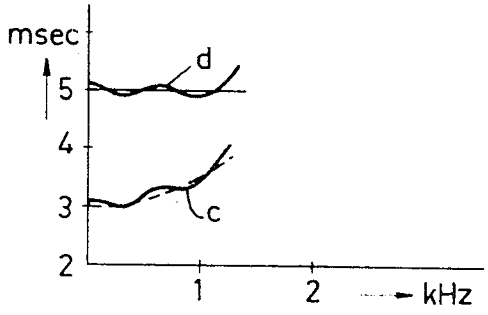

In fact, after demodulation in demodulator devices 5, 6 the demodulated pulse signals have a delay time characteristic of the form shown by curve *c* in FIG. 3*e*, the frequency range of which is equal to half that of the delay time characteristic of the modulated pulse signals preceding the demodulator devices 5, 6. Accordingly the construction of the delay time equalization networks 27, 28 is very simple, for example, the delay time equalization networks 27, 28 only include 2 adjustable dividing networks, and the adjustment to a substantially constant delay time as is shown by curve *d* in FIG. 3*e* is likewise very simple, all the more so because here a strict criterion of adjustment exists. In fact, for this adjustment to a constant delay time with the aid of the delay time equalization networks 27, 28 to obtain an optimum pulse shape, there is no influence on the crosstalk of the channels 3, 4 such in contrast with the known device, in which the pulse shape and the crosstalk are simultaneously influenced by adjustment of the delay time equalization network 20 preceding the demodulator devices 5, 6.

Since the adjustment of the delay time equalization of the two delay time equalization networks 27, 28 in the two receiving channels 3, 4 must be the same, the adjustment of the two delay time equalization networks 27, 28 can take place simultaneously by mechanically coupling together the adjusting members of the delay time equalization networks 27, 28.

Thus, in the device according to the invention a simple and convenient adjustment to an optimum delay time equalization is obtained by means of a minimum number of adjustable networks and clear criteria of adjustment, which equalization as already referred to hereinbefore results in a maximum insensitivity to interference and pulse recognition. It is still to be noted that the realization of these advantages as compared with the known device requires only an extremely slight extension of the number of elements so that the practical use becomes very interesting.

What is claimed is:

1. A receiver for receiving orthogonal modulation signals transmitted through a transmission link having a particular phase shift as a function of frequency characteristic, said receiver comprising a first delay time equalization means having an input coupled to the link for producing a symmetrical about the carrier frequency phase shift versus frequency characteristic with the link phase shift characteristic; a first channel having an input coupled to said first equalization means, said channel comprising the serial coupling in the order recited of a demodulator coupled to said channel input, a channel time delay equalization means coupled to said demodulator for producing a linear phase shift versus frequency characteristic with said link and first equalization means phase characteristics, and a first utilization means coupled to said channel equalization means; a second channel having an input coupled to said first equalization means, said second channel comprising the serial coupling in the order recited of a second demodulator coupled to said second channel input, a second channel time delay equalization means coupled to said second demodulator for producing a linear phase shift versus frequency characteristic with said link and first equalization means phase characteristics, and a second utilization means coupled to said second channel equalization means; and a source of carrier frequency oscillations coupled to said first and second demodulators.

2. A receiver as claimed in claim 1 further comprising means for concurrently adjusting both of said channel equalization means.

3. A receiver as claimed in claim 1 further comprising means coupled between said carrier frequency signal source and one of said demodulators for phase shifting the carrier frequency signal applied thereto.

4. A receiver as claimed in claim 3 wherein said phase shifting means shifts phase by substantially 90°.

5. A receiver as claimed in claim 1 wherein said linear phase shift characteristics comprise substantially a constant.

6. A receiver as claimed in claim 1 wherein each of said channels further comprises a gate coupled to said respective channel equalization means, and a pulse regenerator coupled between said respective gate and said respective utilization means, and further comprising source of clock frequency signals coupled to said gates.

7. A receiver as claimed in claim 1 wherein each of said channels further comprises a low pass filter coupled between said respective channel equalization means and said respective utilization means.

* * * * *